United States Patent [19]

Roerden et al.

[11] Patent Number: 5,241,061

[45] Date of Patent: Aug. 31, 1993

[54] PROCESS FOR THE DRY CATIONIZATION OF STARCH

[75] Inventors: Dorothy L. Roerden, Lake Jackson; Clara D. Wessels, Angleton, both of Tex.

[73] Assignee: The Dow Chemical Company, Midland, Mich.

[21] Appl. No.: 889,688

[22] Filed: May 27, 1992

[51] Int. Cl.$^5$ .............................................. C08B 31/08
[52] U.S. Cl. ........................................................ 536/50
[58] Field of Search ........................ 536/50, 111, 124; 527/300, 312

[56] References Cited

U.S. PATENT DOCUMENTS

| | | | |
|---|---|---|---|
| 3,448,101 | 6/1969 | Billy et al. | 536/50 |
| 3,532,751 | 10/1970 | Laugher et al. | 536/50 |
| 4,127,563 | 11/1978 | Rankin et al. | 536/50 |
| 4,281,109 | 7/1981 | Jarowenko et al. | 536/50 |
| 4,332,935 | 6/1982 | Fischer et al. | 536/50 |
| 4,464,528 | 8/1984 | Tasset | 536/50 |
| 4,602,110 | 7/1986 | Tasset | 564/292 |
| 4,785,087 | 11/1988 | Stober et al. | 536/111 |
| 4,812,257 | 3/1989 | Stober et al. | 106/120 |
| 5,116,967 | 5/1992 | Fischer et al. | 527/300 |

OTHER PUBLICATIONS

Wurzburg, in "Modified Starches, Properties and Uses," CRC Press, Inc. (Boca Raton, Fla., 1986). pp. 188–189 and 392–400.

Grim in "Clay Mineralogy" McGraw-Hill Book Company, New York (2nd ed., 1968) pp. 188–189 & 392–400.

*Primary Examiner*—John Kight, III
*Assistant Examiner*—Jeffrey Culpeper Mullis

[57] ABSTRACT

A process for dry cationization of starch or a starch-containing material comprises reacting the starch or starch-containing material with a dialkyl(epoxyalkyl)amine or trialkyl(epoxyalkyl) ammonium halide in a medium containing a maximum of 40% by weight of water in the presence of an alkali metal or alkaline earth metal oxide or hydroxide and a finely-divided aluminosilicate clay, having a cation-exchange capacity less than about 15 meq/100 g.

23 Claims, No Drawings

PROCESS FOR THE DRY CATIONIZATION OF STARCH

DESCRIPTION

1. Technical Field

This invention relates to an improved process for preparing cationic starch derivatives, which are used in the paper and mineral separation fields. Representative uses of cationic starch derivatives include use as pigment retention aids, internal sizing agents or flocculants.

2. Background Art

Stober et al. (U.S. Pat. Nos. 4,812,257 and 4,785,087), herein incorporated by reference, have proposed dry cationization of starch at 5°–40° C. in the presence of an alkaline material and finely-divided silica.

Rankin et al., U.S. Pat. No. 4,127,563, herein incorporated by reference, have proposed a "dry" process for the preparation of cationic starches or flours, in which starch is reacted with a quaternary ammonium halohydrin at pH of 9 or below.

Fischer et al. (U.S. Pat. No. 4,332,935) have proposed preparation of cationic starch ethers at 50°–120° C. by spraying starch with a quaternary epoxide in the presence of calcium oxide or calcium hydroxide.

DISCLOSURE OF INVENTION

In one aspect, this invention relates to a process for the dry cationization of starch or a starch-containing material comprising reacting the starch or starch-containing material with a dialkyl(epoxyalkyl)amine or trialkyl(epoxyalkyl) ammonium halide in a medium containing a maximum of 40% by weight of water in the presence of an alkali metal or alkaline earth metal oxide or hydroxide and a finely-divided aluminosilicate clay, having a cation-exchange capacity less than about 15 meq/100 g.

This invention further relates to a composition, useful for the dry cationization of starch, the composition comprising a mixture of 10–50% by weight of a finely-divided aluminosilicate clay, having a cation-exchange capacity less than about 15 meq/100 g, and 50–90% by weight of an alkali metal of alkaline earth metal oxide or hydroxide.

DETAILED DESCRIPTION OF THE INVENTION

Dialkyl(epoxyalkyl)amines can be represented by the formula

wherein alk is alkyl of 1-8 carbon atoms and n is 1-10. These compounds are accordingly N,N-dialkylepoxyalkyl compounds in which the each of the alkyl moieties, attached to the nitrogen atom, is independently of 1–10 carbon atoms. Lower molecular weight species are generally preferred, particularly N,N-dimethylamino-2,3-epoxypropane or N,N-diethylamino-2,3-epoxypropane, in which alk are both methyl or ethyl and n is 1. Use of these compounds permits introduction of the greatest amount of cationic functionality into the starch molecule.

Trialkyl(epoxyalkyl)ammonium halides can be represented by the formula

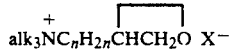

wherein alk and n are as above and X⁻ is chloride, bromide or iodide.

The trialkyl(epoxyalkyl)ammonium halides can be obtained by quaternizing a dialkyl(epoxyalkyl)amine by treatment with an alkyl halide. The preferred trialkyl(epoxyalkyl)ammonium halides are the lower molecular weight members of the group, particularly trimethyl(epoxypropyl)ammonium chloride and triethyl(epoxypropyl)ammonium chloride, wherein alk is methyl or ethyl, n is 1 and X⁻ is choride.

The epoxides can be prepared from corresponding trialkyl(chlorohydroxyalkyl)ammonium halides of the formula

by dehydrohalogenation with an alkaline material, for example, sodium hydroxide.

The carbon chain, $-C_nH_{2n}-$, can be linear or branched. The carbon chain accordingly includes alkylene moieties, e.g., methylene, ethylene, methylethylene, trimethylene, tetramethylene, isopropylidene, and the like. In the simplest and preferred compounds, in which n is 1, only one isomer is possible. These compounds correspond to derivatives of 2,3-epoxypropylamine or the corresponding halohydrin (3-chloro-2-hydroxypropylamine).

In the first step of the process a 3-chloro-2-hydroxypropyltrialkylammonium chloride, for example, 3-chloro-2-hydroxypropyltrimethylammonium chloride, is converted to an epoxide by dehydrohalogenation with an alkaline material, for example, sodium hydroxide. This starting material corresponds to a compound in which each alk is methyl. 3-Chloro-2-hydroxypropyltrimethylammonium chloride can be prepared and purified as disclosed by Langher et al. (U.S. Pat. No. 3,532,751) and Tasset (U.S. Pat. No. 4,602,110), herein incorporated by reference.

The alkaline material can be selected from alkali metal and alkali earth metal oxides, hydroxides and carbonates. Representative alkaline materials include sodium hydroxide, potassium hydroxide, lithium hydroxide, sodium oxide, sodium carbonate, sodium bicarbonate, nahcolite, calcium oxide, calcium hydroxide and calcium carbonate, magnesium oxide, magnesium hydroxide, magnesium carbonate, dolime and the like. Mixtures of alkaline materials can be used. Of the foregoing alkaline materials, sodium and potassium hydroxides are preferred.

The reaction is generally carried out in an aqueous medium with cooling, generally to 0° C. to 5° C. The amount of alkaline material used for converting the halohydrin to the epoxide is at least one equivalent of alkaline material per equivalent of halohydrin. A slight excess of alkaline material may be used, up to about 1.15 equivalent of alkaline material per equivalent of halohydrin. Preferably, trialkyl(epoxyalkyl)ammonium halide is prepared immediately before use from a corresponding trialkyl(chlorohydroxyalkyl)ammonium halide by reaction with sodium hydroxide, present in 100–110 molar % of the amount theoretically required for converting trialkyl(chlorohydroxyalkyl)ammonium halide to epoxide. The thus-prepared epoxyalkyltrialkylammonium halide is used without further purification for the next step of the synthesis.

It will be understood that preparation of an epoxyalkyl trialkylammonium chloride need not be carried out immediately before use, should this material be available in large quantities from another source.

Starch or starch-containing materials include starches and flours, obtained from cereal grains, including corn, wheat, sorgum, rice, barley, etc., or from root crops, including potato, tapioca, etc. The starches can be unmodified or modified by dextrinization, hydrolysis, oxidation or derivatization, provided that the starches contain some free hydroxyl groups for reaction with the dialkyl(epoxyalkyl)amine or trialkyl(epoxyalkyl)ammonium halide or corresponding halohydrin to produce a cationic starch ether product. Preferably, the starch is unmodified corn, wheat or potato starch.

The starch can be unfractionated or can be separated into amylose or amylopectin fractions. The starch feed can contain up to about 25% by weight of water, although it is prefered that the starch or starch-containing material contain no more than 10-15% by weight of water.

Water in the reaction medium is introduced by three sources, the starch, the quaternary ammonium or epoxide solution and the alkali metal or alkaline earth oxide or hydroxide. In typical cases, potato starch contains about 14% by weight of water, corn starch about 8-9% of water and wheat starch about 9-10% by weight of water.

Aqueous solutions of halohydroxyalkyldialkylamines or their epoxidation products may contain as much as 50% by weight of water. A commonly-used solution of 3-chloro-2-hydroxypropyltrimethylammonium chloride contains 35% by weight of water.

The alkali metal or alkaline earth metal oxide or hydroxide may be used as an aqueous solution, which is mixed with a solution of halohydroxyalkyldialkylamine or halohydroxyalkyltrialkylammonium halide to prepare the epoxide. Typically, solutions of oxide/hydroxide are 10-15% aqueous solutions.

In a representative case, using 3-chloro-2-hydroxypropyltrimethylammonium chloride (35% by weight of water), sodium hydroxide solution (13.5% solution) and 100 g of potato starch, the water content of the reaction medium is:

| | |
|---|---|
| 14.1626 g | from the starch |
| 3.1260 g | from the CHPTMAC solution |
| 7.9196 g | from the NaOH solution |
| 25.2422% | by weight of water |

The process of this invention can be carried out in media, containing up to a maximum of 40% by weight of water. However, it is preferred to carry out the process in media, containing a maximum of 30% by weight of water.

Although it will be understood that starch or starch-containing materials normally contain a plurality of hydroxy groups in the polymeric units, the general reaction can be represented by the equation

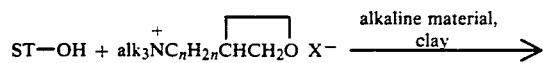

wherein ST—OH represents a single reactive hydroxyl group of a starch or modified starch molecule.

The alkaline materials, used in this step, can be selected from among those, used to prepare the epoxyalkyl trialkyammonium halide. However, calcium oxide is preferred for the conversion of starch to cationic starch, in the presence of an aluminosilicate clay.

The amount of alkaline material for this step can be varied from about 2 mol to about 50 mol, per mol of epoxyalkyltrialkylammonium halide. Preferably, from about 2 mol to about 10 mol are used.

Aluminosilicate clays which can be used in the practice of this invention include various phyllosilicate minerals, which comprise seven different subclasses:

(a) clays having a two-layer structure, including the kaolin group (kaolinite, dickite, nacrite, metahalloysite, halloysite, allophane and anauxite) and the septochlorite group (serpentine, chrysotile, antigorite, pierolite, lizardite, garnierite, percoraite, greenalite, berthierite, bementite, amesite, grovesite and cronstedtite);

(b) clays having primitive three-layered structures, comprising pyrophyllite, talc, minnesotaite and willemseite;

(c) the micas, including leucophyllite, celadonite, glauconite, phengite, alurgite, mariposite, illite, brammallite, hydromuscovite, muscovite, paragonite, roscoelite, fuchsite, ollacherite, sericite, taeniolite, polylithionite, lepidolite, zinnwaldite, manganophyllite, hendricksite, biotite, phlogopite, siderophyllite, annite and lepidomelane;

(d) brittle micas, including margarite, bityite, ephesite, xanthophillite, clintonite and anandite;

(e) expandable three-layer structures, including smectites (montmorillonite, beidellite, nontronite, volchonskoite, hectorite, saponite, stevensite, sauconite and pimelite) and vermiculite;

(f) four-layer structures, including chlorite, thuringite, chamosite, ripidolite, brunsvigite, diabandite, sheridanite, clinochlore, penninite, ferrian, chromian, kammererite, manganian, pennantite, gonyerite, nimite and cookeite; and (g) pseudolayer silicates, including apophophyllite, sanbornite, gillespite, cuprorivaite, palygorskite, sepiolite, prehenite, stipnomelane, fenaksite, chrysocolla, krauskopfite, okenite, nekoite, stillwellite, ekanite, the melilite group (gehlenite, akermanite and hardystonite), leucophanite, meliphanite, datolite, gadoninite, homilite, leucosphenite, dalyite, astrophyllite, kupletskite and niobophyllite.

It has been found that aluminosilicate clays, useful in the practice of this invention, are those having a low cation-exchange capacity, particularly a cation-exchange capacity below about 15 meq/100 g. Cation-exchange capacities of aluminosilicate clays have been reported in Grim, "Clay Mineralogy," McGraw-Hill Book Company, New York (2nd ed., 1968), page 189:

| Clay | meq/100 g |
|---|---|
| kaolinite | 3–15 |
| halloysite · 2 H$_2$O | 5–10 |
| halloysite · 4 H$_2$O | 40–50 |
| smectite | 80–150 |
| illite | 10–40 |
| vermiculite | 100–150 |

| Clay | meq/100 g |
| --- | --- |
| sepiolite-attapulgite-palygorskite | 3–15 |

Preferred aluminosilicate clays include those having a cation-exchange capacity less than about 10 meq/100 g, particularly kaolinite, halloysite dihydrate, or sepiolite-attapulgite-palygorskite. Kaolinite clay is most preferred.

Cation-exchange capacity of the clays can be determined by treating a sample of the clay with a dialkyl(epoxyalkyl)amine or trialkyl(epoxyalkyl)ammonium halide in the presence of an alkali metal or alkaline earth metal oxide or hydroxide, under the same conditions used for preparing cationic starch. The nitrogen (Kjeldahl) content of the cationized clay, corrected for the nitrogen content of untreated control clay, represents the extent of cationization. This value can be converted to meq/100 g by the following calculations:

for a kaolin sample, containing 0.031% of nitrogen:

$$[0.00031\ g \times (1000\ meq/eq)/(14\ g/eq) = 0.022\ meq/g = 2.2\ meq/100\ g$$

It has been found that the thus-measured cation exchange capacity of kaolin clay is much lower than the cation-exchange capacity of silicic acid (15.5 meq/100 g), use of which was disclosed by Stober, supra. It is proposed that aluminosilicate clays have a lower cation-exchange capacity than silicic acid because of their significantly lower surface area.

It is believed that a significant advantage of the present invention is that a higher proportion of epoxyalkyl trialkylammonium halide reacts with the starch, than in reactions using silicic acid. This permits higher effective utilization of the cationizing agent and results in less cationic nitrogen being tied up in the clay, in which the cationic functionality is useless for many applications. In addition, kaolin is frequently added to paper furnish, so that its presence is not in any way objectionable.

Compositions comprising a mixture of 10–50% by weight of a finely-divided aluminosilicate clay, having a cation-exchange capacity less than about 15 meq/100 g, and 50–90% by weight of an alkali metal or alkaline earth metal oxide or hydroxide can be used for dry cationization of starch or starch-containing materials. Preferred compositions are those wherein the aluminosilicate clay has a cation-exchange capacity less than about 10 meq/100 g. Preferably, the aluminosilicate clay is kaolinite, halloysite dihydrate, or septiolite-attapulgite-palygorskite. The most preferred aluminosilicate clay is kaolinite.

The alkai metal or alkaline earth metal oxide or hydroxide is selected from the compounds described above. Preferably, the alkali metal or alkaline earth metal oxide or hydroxide is calcium oxide.

A most preferred composition is that therein the aluminosilicate clay is kaolinite and the alkali metal or alkaline earth metal oxide or hydroxide is calcium oxide. Most preferably, the composition contains 35–50% by weight of calcium oxide and 50–65% by weight of kaolinite.

A process for dry cationization of starch or a starch-containing material, comprising reacting the starch or starch-containing material with a dialkyl(epoxyalkyl)amine or trialkyl(epoxyalkyl)ammonium halide in a medium containing a maximum of 40% by weight of water, in the presence of a composition comprising a mixture of 10–50% by weight of a finely-divided aluminosilicate clay, having a cation-exchange capacity less than about 15 meq/g, and 50–90% by weight of an alkali metal or alkaline earth metal oxide or hydroxide. Most preferably, a composition containing 35–50% by weight of calcium oxide and 50–65% by weight of kaolinite, is used.

The process of this invention is carried out at a temperature near ambient, preferably without external heating or cooling. The cationic starches, prepared by the process of this invention, can be stored indefinitely at room temperature without loss of cationic activity.

BEST MODE FOR CARRYING OUT THE INVENTION

In a most preferred embodiment, the process of this invention is that wherein the starch is unmodified corn, wheat or potato starch; the aluminosilicate clay is kaolinite; the alkaline earth oxide is calcium oxide; and the trialkyl(epoxyalkyl)ammonium halide is prepared immediately before use from trimethyl(chlorohydroxypropyl)ammonium chloride or triethyl(chlorohydroxylpropyl)ammonium chloride by reaction with sodium hydroxide, present in 100–110 molar % of the amount theoretically required for converting trimethyl- or triethyl(chlorohydroxypropyl)ammonium chloride to epoxide.

Without further elaboration it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Celsius. Unless otherwise indicated, all parts and percentages are by weight.

EXAMPLE 1

(a) Quaternization of Starch

To a solution of 3-chloro-2-hydroxypropyltrimethylammonium chloride (7.2575 g, 0.0246 mol, 63.75% of CHPTMAC) in a plastic Mettler Memotitrator cup is added slowly, over several min, 6.50 mL of 3.88 NaOH solution (0.0252 mol). The cup is placed under the stirrer of the Memotitrator and is stirred, automatically, for 10 min. During this time, CHPTMAC is converted to 2,3-epoxypropyltrimethyl ammonium chloride.

While the epoxide is being formed, 93.48 of potato starch (14.1626% by weight of water, 0.4953 mol, real) is weighed out into a large mixer bowl. Into separate containers are weighed 5.6147 g (0.2 mol) of dry CaO and 7.7977 g of kaolin (0.03 mol).

The bowl containing the starch is attached to the mixer base and stirred at a low speed. Calcium oxide and kaolin are added slowly to the stirred mixture over 5 min. The freshly-prepared epoxide solution is sprayed over the kaolin-CaO mixture, which is stirred at a low speed, over about 10 min. At the end of the addition of epoxide solution, the stirring rate is increased and the stirring continued for 5 min. The resulting mixture is transferred to a glass or plastic bottle and kept at room temperature for 1, 2 or 3 days prior to analysis.

(b) Analysis of Product

Aliquots (50 g) are used. Salts are removed from the product by pouring an aliquot into a clean 2000-mL beaker. To the product is added a solution of 750 mL of water and 250 mL of ethanol. Stirring is initiated. The pH of the mixture is determined and sufficient 3N HCl (20–30 mL) is added to reduce the pH to 7. The resulting mixture is stirred for 10 min more and filtered under vacuum through Whatman #54 filter paper. When the filter cake appears to be dry, the vacuum line is disconnected and the filter cake is broken up and placed in a clean 2000-mL beaker. The product is reslurried with a solution of 750 mL of water and 250 mL of ethanol. The slurry is filtered and the filter cake is reslurried with 750 mL of water and 250 mL of ethanol. The slurry is filtered and the filter cake is slurried with 950 mL of ethanol and 50 mL of water for 10 min. The filter cake, after filtration under vacuum, is placed on a clean watch glass and dried in an oven (50° C., 30 min) to remove any residual ethanol. The dry, washed product is stored in a clean glass bottle.

Water content of the product is determined (triplicate) by placing a weighed sample in an oven (50° C., 24 h) to determine weight loss. A representative sample, stored for 2 days at room temperature, contains 11.788% by weight of water (triplacate).

Nitrogen is determined by Kjeldahl analysis. A washed sample, stored for two days at room temperature, contains 0.3579% of N (dry basis). This corresponds to a yield of 87.23% (cationic starch+kaolin) or 93.2% for cationic starch.

(c) Reproducibility of Results

Experiments are run as in (a). The middle point of a triplicate run is 89.6% of cationic starch.

EXAMPLE 2

Effect of Storage Time on Product Composition; Cationization without Clay (a) Cationic starch is prepared without kaolin clay, otherwise as in Example 1(a) and stored at room temperature for up to a week. The following yields are obtained as a function of storage time:

| Days of storage | Yield |
| --- | --- |
| 1 | 91.09 ± 1.01 |
| 2 | 91.84 ± 1.02 |
| 3 | 90.40 ± 1.00 |
| 4 | 89.56 ± 0.99 |
| 7 | 91.13 ± 1.01 |

These results show that the process is essentially complete after 24 h and that longer storage time is not deleterious.

EXAMPLE 3

Cationization of Various Starches

Starch is cationized as in Example 1(a), using 0.20 mol of CaO and 0.03 mol of kaolin. The cationized starch is stored at room temperature for two days prior to analysis.

The following results are obtained:

| Starch | Yield |
| --- | --- |
| potato | 88.8% |
| corn | 84.6 |
| wheat | 84.3 |

These results show that the process is essentially independent of the type of starch used.

EXAMPLE 4

Variation of Amount of Clay

Experiments are done as in Example 1(a), using 0.02 mol of CaO and potato starch. The following results are obtained:

| % by weight | mol | Yield |
| --- | --- | --- |
| 2.137 | 0.01 | 83.5% |
| 4.345 | 0.02 | 91.1 |
| 6.379 | 0.03 | 88.9 |
| 8.328 | 0.04 | 89.1 |
| 18.509 | 0.10 | 89.2 |

These results show that optimum results can be obtained in the presence of small amounts of kaolin clay.

EXAMPLE 5

Variation of Amount of Calcium Oxide

Cationization is carried out, otherwise as in Example 1(a), using a constant amount of kaolin and varying the amount of CaO. Results for product, cationized potato starch, stored at room temperature for one day are:

| mol CaO | Yield |
| --- | --- |
| 0.10 | 87.6% |
| 0.15 | 89.6% |
| 0.20 | 89.6 |
| 0.25 | 88.7% |

These results show that using a great excess of CaO is unnecessary.

EXAMPLE 6

(a) Determination of Cation-Exchange Capacity of Clay and Silicic Acid

Cation-exchange capacity is measured by subjecting a clay (kaolin) or silicic acid to a reaction, otherwise as in Example 1(a), in the absence of starch.

The following materials are used:

| material | g |
| --- | --- |
| kaolin | 12.9154 |
| CaO | 5.6439 |
| CHPTMAC | 7.2603 |
| NaOH (3.88 N solution) | 7.500 |
| silicic acid (−100 mesh) | 12.0898 |
| CaO | 5.6439 |
| CHPTMAC | 7.2603 |
| NaOH (3.88 N solution) | 7.500 |

The kaolin or silicic acid is weighed into a clean, dry, bowl. Calcium oxide is weighed into a clean, dry beaker. The dry calcium oxide is sprinkled over the surface of the kaolin or silicic acid and thoroughly mixed for 5 min, using an automatic mixer at a slow speed. The resulting dry mixture is stirred at a slow speed while a mixture of CHPTMAC/NaOH is added by a pipette to the middle of the bowl. This requires about 5 min, taking care that no portion of the mixture becomes so wet as to cause clumping. Stirring is stopped and solids are scraped from the sides of the bowl. Stirring at a higher rate is resumed for 5 min. The mixture is washed with water and ethanol to remove all unreacted CHPTMAC, as in Example 1(a).

Samples are analyzed for nitrogen content by the Kjeldahl method. The nitrogen content of the control is subtracted from the nitrogen content of the cationized clay to give % N, attributable to cationic nitrogen. Results are:

| Sample | % cationic N | meq/q |
|---|---|---|
| kaolin | 0.031 | 0.022 |
| silicic acid | 0.217 | 0.155 |

These results show that silicic acid has about seven times the ion-exchange capacity for cationic nitrogen as kaolin.

(b) Determination of Surface Area of Clays

Surface area of the materials, investigated in (a), are measured by the B. E. T. procedure. The following results are obtained:

| | |
|---|---|
| kaolin | 15.4 m$^2$/g |
| silicic acid | 700 m$^2$/g |

It is believed that the high cation-exchange value for silicic acid is related to the high surface area.

It is proposed that the increase in yield from 91.4% to 93.9% reported by Stober (U.S. Pat. No. 4,812,257) for cationization of starch in the presence of silicic acid is caused by cationization of the silica (0.50% added), rather than due to increased cationization of the starch.

EXAMPLE 7

Flocculation Testing (a) Preparation of Materials

Clay slurry is prepared using Attasorb LVM clay (Englehard Corp., Edison, N.J.). A suspension of 1% of clay in water is prepared by stirring overnight at room temperature. The resulting slurry is stored in a capped container at room temperature.

Starch samples are prepared by weighing 5.0 g of starch sample into a 100-mL volumetric flask. About 50 mL of water is added and the mixture is swirled to dissolve the starch. Water is added to the 100-mL mark and the contents of the flask are swirled to assure homogeneous mixing.

The following materials are evaluated:
(a) Cationized starch-StaLok-324 (A. E. Staley Manufacturing Co., Decatur, Ill.)
(b) Attasorb solution-1% (distilled water added to 50-mL marking)
(c) Pearl starch (A. E. Staley, research sample)
(d) Cationized starch-(4.5 g of starch, 0.5 g of silica)
(e) Cationized starch-(4.5 g of starch, 0.5 g of kaolin)
(f) Cationized starch-Example 1(a)

(b) Test Procedure

A 50-mL graduated cylinder is filled with exactly 45 mL of the 1% clay solution, prepared above. The sample being evaluated (5 mL) is added to bring the volume up to 50 mL. The cylinder is capped and inverted carefully three times to mix the contents. The cylinder is returned to an upright position and timing is initiated, using a stopwatch. The endpoint is the time at which the clay is flocculated to the 35-mL marking on the graduated cylinder.

The following results are obtained:

| Sample | Min. to 35-mL Level |
|---|---|
| Attasorb solution | 18.78 |
| Pearl starch | 17.58 |
| Cationized starch | 4.17 |
| Cationized starch + SiO$_2$ | 3.83 |
| Cationized starch + kaolin | 10.28 |

These results show that kaolin clay does not inflate the cationic charge on the starch, which therefore can be accurately metered into a mixture being treated therewith.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for dry cationization of starch or a starch-containing material, comprising reacting the starch or starch-containing material with a dialkyl(epoxyalkyl)amine or trialkyl(epoxyalkyl) ammonium halide in a medium containing a maximum of 40% by weight of water in the presence of an alkali metal or alkaline earth metal oxide or hydroxide and a aluminosilicate clay, having a cation-exchange capacity less than about 15 meq/100 g.

2. The process of claim 1, wherein the alkali metal or alkaline earth metal oxide or hydroxide is calcium oxide.

3. The process of claim 1, wherein the aluminosilicate clay has a cation-exchange capacity less than about 10 meq/100 g.

4. The process of claim 3, wherein the aluminosilicate clay is kaolinite, halloysite dihydrate, or septiolite-attapulgite-palygorskite.

5. The process of claim 4, wherein the aluminosilicate clay is kaolinite.

6. The process of claim 1, wherein the dialkyl(epoxyalkyl)amine is N,N-dimethylamino-2,3-epoxypropane or N,N-diethylamino-2,3-epoxypropane or the trialkyl(epoxyalkyl)ammonium halide is N,N,N-trimethyl-(2,3-epoxypropyl)ammonium chloride or N,N,N-triethyl-(2,3-epoxypropyl)ammonium chloride.

7. The process of claim 1, wherein the trialkyl(epoxyalkyl) ammonium halide is prepared immediately before use from a corresponding trialkyl(chlorohydroxyalkyl) ammonium halide by reaction with sodium hydroxide, present in 100-110 molar % of the amount theoretically required for converting trialkyl(chlorohydroxyalkyl) ammonium halide to epoxide.

8. The process of claim 7, wherein the trialkyl(chlorohydroxyalkyl) ammonium halide is trimethyl(epoxypropyl)ammonium chloride or triethyl(epoxypropyl)ammonium chloride.

9. The process of claim 1, wherein the starch is unmodified corn, wheat or potato starch.

10. The process of claim 1, wherein the reaction is done without external heating or cooling.

11. The process of claim 1, wherein the medium contains a maximum of 30% by weight of water.

12. The process of claim 1, wherein starch is unmodified corn, wheat or potato starch; the aluminosilicate clay is kaolinite; the alkaline earth oxide is calcium oxide; and the trialkyl(epoxyalkyl)ammonium halide is prepared immediately before use from trimethyl(chlorohydroxypropyl)amonium chloride or triethyl(chlorohydroxylpropyl)ammonium chloride by reaction with sodium hydroxide, present in 100-110 molar % of the amount theoretically required for converting trimethyl- or triethyl(chlorohydroxypropyl)ammonium chloride to epoxide.

13. The process of claim 1, wherein the starch or starch-containing material contains up to about 25% by weight of water.

14. The process of claim 1, wherein the starch or starch-containing material contains no more than about 10-15% by weight of water.

15. The process of claim 1, wherein the dialkyl(epoxyalkyl)amine or trialkyl(epoxyalkyl)ammonium halide is in the form of an aqueous solution, containing up to about 50% by weight of water.

16. The process of claim 15, wherein the dialkyl(epoxyalkyl)amine or trialkyl(epoxyalkyl)ammonium halide solution is prepared using a 10-15% aqueous solution of alkali metal or alkaline earth metal oxide or hydroxide.

17. The process of claim 1, wherein the starch or starch-containing material contains up to about 25% by weight of water and the dialkyl(epoxyalkyl)amine or trialkyl(epoxyalkyl)ammonium halide is in the form of an aqueous solution, containing up to about 50% by weight of water.

18. The process of claim 1, wherein the starch or starch-containing material contains no more than about 10-15% by weight of water and the dialkyl(epoxyalkyl)amine or trialkyl(epoxyalkyl)ammonium halide is in the form of a solution, prepared using a 10-15% aqueous solution of alkali metal or alkaline earth metal oxide or hydroxide.

19. A process for dry cationization of starch or a starch-containing material, comprising reacting the starch or starch-containing material with a dialkyl(epoxyalkyl)amine or trialkyl(epoxyalkyl)ammonium halide in a medium containing a maximum of 40% by weight of water, in the presence of a composition comprising a mixture of 10-50% by weight of an aluminosilicate clay, having a cation-exchange capacity less than about 15 meq/100 g, and 50-90% by weight of an alkali metal or alkaline earth metal oxide or hydroxide.

20. The process of claim 19, wherein the trialkyl(epoxyalkyl)ammonium halide is made immediately before use from 3-chloro-2-hydroxypropyltrimethylammonium chloride or 3-chloro-2-hydroxypropyltriethylammonium chloride.

21. A process for dry cationization of starch or a starch-containing material, comprising reacting the starch or starch-containing material with a dialkyl(epoxyalkyl)amine or trialkyl(epoxyalkyl)ammonium halide in a medium containing a maximum of 40% by weight of water, in the presence of a composition comprising a mixture of 50-65% by weight of kaolinite, having a cation-exchange capacity less than about 15 meq/100 g, and 35-50% by weight of calcium oxide.

22. The process of claim 21, wherein the trialkyl(epoxyalkyl)ammonium halide is made immediately before use from 3-chloro-2-hydroxypropyltrimethylammonium chloride or 3-chloro-2-hydroxypropyltriethylammonium chloride.

23. The process of claim 21, wherein the starch or starch-containing material contains no more than about 10-15% by weight of water and the dialkyl(epoxyalkyl)amine or trialkyl(epoxyalkyl)ammonium halide solution is in the form of a solution, prepared using a 10-15% aqueous solution of alkali metal or alkaline earth metal oxide or hydroxide.

* * * * *